United States Patent
Greiner et al.

(10) Patent No.: US 6,878,765 B2
(45) Date of Patent: *Apr. 12, 2005

(54) METHOD FOR PRODUCING A COMPONENT AND THE USE OF SAID COMPONENT

(75) Inventors: Robert Greiner, Baiersdorf (DE); Angelo Polese, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 359 days.

This patent is subject to a terminal disclaimer.

(21) Appl. No.: 10/149,903
(22) PCT Filed: Dec. 13, 2000
(86) PCT No.: PCT/DE00/04430
§ 371 (c)(1), (2), (4) Date: Oct. 16, 2002
(87) PCT Pub. No.: WO01/44356
PCT Pub. Date: Jun. 21, 2001

(65) Prior Publication Data
US 2003/0113511 A1 Jun. 19, 2003

(30) Foreign Application Priority Data
Dec. 15, 1999 (DE) ......................... 199 60 550

(51) Int. Cl.$^7$ ................................. C08K 3/40
(52) U.S. Cl. ................. 524/403; 524/414; 501/42; 501/43; 501/44; 501/45; 501/46; 501/47; 501/48

(58) Field of Search .................. 524/403, 414; 501/42–48

(56) References Cited

U.S. PATENT DOCUMENTS

| | | | | |
|---|---|---|---|---|
| 6,734,243 B2 | * | 5/2004 | Greiner et al. | 524/403 |
| 6,762,219 B2 | * | 7/2004 | Greiner et al. | 523/223 |
| 6,790,882 B2 | * | 9/2004 | Greiner et al. | 523/223 |
| 6,809,134 B2 | * | 10/2004 | Greiner et al. | 524/101 |

FOREIGN PATENT DOCUMENTS

| | | |
|---|---|---|
| EP | 0 365 236 | 4/1990 |
| JP | 03 170558 | 7/1991 |

OTHER PUBLICATIONS

USPTO obtained translation for JP 3–170558–A (Jul. 24, 1991) Yokokura, et al.*

* cited by examiner

Primary Examiner—Matthew A. Thexton
(74) Attorney, Agent, or Firm—Young & Thompson

(57) ABSTRACT

A method for producing a component from a glass/polymer mixture where, a component is formed from a mixture of a thermoplastic with a processing temperature T1 and first glass particles with saturated surface bonds and a glass temperature T2<T1, at a temperature T3>T1. By melting the first glass particles, second glass particles are produced with surface bonds which can be saturated. The bonds are saturated by being bonded to the thermoplastic.

6 Claims, 1 Drawing Sheet

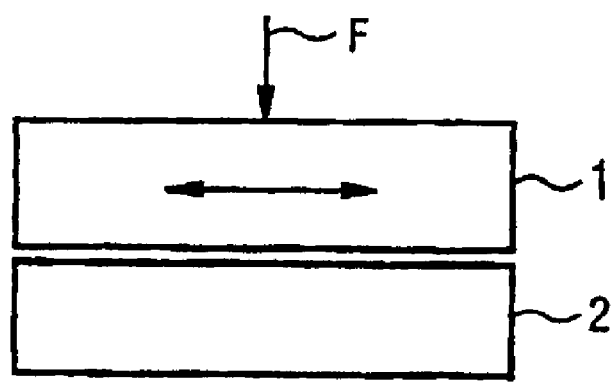

METHOD FOR PRODUCING A COMPONENT AND THE USE OF SAID COMPONENT

The invention relates to a process for producing a component from a glass/plastic mixture. The invention also relates to the use of the component which is produced using the process.

Components used in electrical engineering and electronics are increasingly being produced from plastics materials, in particular based on thermoplastics. To improve the mechanical and thermal properties, a filler is admixed with the plastics material. The filler used is in particular glass. To improve the mechanical stability of the plastics material, the glass is added in the form of glass fibers (fiber-reinforced plastics). The glass fibers are embedded in the plastic. It is increasingly necessary for the components to be able to withstand a soldering bath. Only then can they be suitable for surface mounting (SMT). Therefore, the thermoplastics used are preferably high-temperature thermoplastics.

Injection molding is a conventional process for producing the components. Producing the components by injection molding causes some of the glass fibers to be forced to the surface or even to project out of the surface. These glass fibers projecting out of the surface may tear off or cause further glass fibers close to the surface to be exposed during mechanical operation of the component. This results in not inconsiderable abrasion to the components. If the components are used in electromechanical switches, e.g. relays, this results in a further drawback. The glass-fiber particles which have been abraded from the surface of the component causes the electrical contacts of the relay to become dirty, which in extreme circumstances may even lead to the relay failing.

The liquid crystal polymers (LCP) which are preferably used as high-temperature thermoplastic, containing 30% by weight of glass fibers, have a further drawback. On account of the layer structure which is typical of LCPs and is formed in particular in injection moldings, the components produced using LCP have poor frictional properties. When these components are used, the abovementioned drawbacks are avoided by the fact that an external lubricant is used. An external lubricant has the drawback that it is consumed over the course of time and that it too can lead to electrical contacts becoming dirty.

SUMMARY OF THE INVENTION

Therefore, it is an object of the present invention to provide a process for producing a component from a glass/plastic mixture which undergoes little abrasion.

The invention describes a process for producing a component from a glass/plastic mixture in which the starting point is a mixture of a thermoplastic which has a processing temperature T1 and first glass particles which have saturated bonds at the surface. A further property of the first glass particles is that they have a glass temperature T2<T1. The component is molded at a temperature T3>T1, with the result that the first glass particles are melted. The melted first glass particles form second glass particles with saturable bonds at the surface. The saturable bonds at the surface of the second glass particles are saturated by bonding to the thermoplastic.

The inventive process for producing a component from a glass/plastic mixture having glass particles which at the surface have bonds which are saturated, for example through storage in air, and which, on account of the low glass temperature, are converted into new particles with saturable bonds at the surface, results in very good bonding of the glass particles to the plastic matrix. As a result, exposed glass particles or glass-particle ends at the surface of the component are avoided, with the result that they produce only an extremely small amount of abrasion under mechanical friction. This reduced abrasion has the further advantage that there is no need to take special measures to keep the air clean, for example to filter out glass fibers or glass-fiber particles. Furthermore, there are cost savings in machines and tools, since the wear is greatly reduced compared to the known glass fiber-reinforced materials.

The glass melt also differs from the solidified glass with regard to the condition of its surface. While the active polar terminal groups of a solidified glass are, for example, saturated with hydroxyl groups of the water which is always present in the ambient air and as a result lose their activity, in the molten glass the free and active terminal groups are still present and, on contact with, for example, metal or plastic, interact with the metal and/or plastic surface, producing good wetting and/or bonding to this surface.

In the process for producing a component, it is preferable to use a glass/plastic mixture which contains:

as glass, particles of a low-melting sulfophosphate glass of the following composition, given in mol %:
4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$, and 19 to 22% of $SO_3$, the constituents together amounting to 100%, and as plastic, a high-performance thermoplastic.

A "low-melting" sulfophosphate glass is understood as meaning a glass with a low glass temperature T2, in particular a glass with T2<300° C. The glass temperature is to be understood as meaning the temperature at which the glass softens and thus becomes able to flow. A "high-performance thermoplastic" is a high-performance polymer and specifically in the present case, a temperature-stable plastic (heat-resistant polymer, high-temperature resistant polymer). The processing temperature T1 of the plastic is at least 300° C., since only in this way is it possible to ensure that the components produced therefrom are able to withstand soldering baths. The glass temperature T2 is lower than the processing temperature T1, with the result that the glass is in the free-flowing state. As a result, the glass/plastic mixture has very good flow properties for the production of thin-walled components or of components with a complicated geometry.

The glass/plastic mixtures according to the invention have good mechanical and thermal properties and good processing properties, in particular a good ability to flow, even with a high filler content, i.e. a high glass content. Moreover, they are distinguished by an excellent resistance to chemicals, in particular to water, acids and bases, and specifically, surprisingly, without the need for stabilizers to be added. Furthermore, the glass/plastic mixtures have an excellent resistance to abrasion, and the material can be recycled without problems, since there is no shortening of the glass component as occurs in glass fiber-reinforced mixtures.

The glass/plastic mixtures according to the invention preferably include a glass with a glass temperature of 250° C.$\leq$T2$\leq$280° C. In the mixtures, it is preferable to use a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$. This glass has a glass temperature T2 of 268° C.

The high-performance thermoplastic used is advantageously a polyether ether ketone (PEEK), a polyetherimide (PEI), a polyphenylene sulfide (PPS), a partially aromatic polyamide, such as polyphthalamide (PPA) or a liquid crystal polymer (LCP). In these polymers, the glass temperature of the glass component is matched to the processing temperature of the thermoplastic material. Further high-performance thermoplastics which can be used are polyaryl ether ketones (PAEK) in general, for example polyether ketones (PEEK), and polysulfones (PSU), in particular polyethersulfones (PES) and polyphenylene sulfones (PPSU). In particular, the use of polyphenylene sulfide and polyether ether ketone has the advantage that they result in components which have very good frictional properties. As a result, it is possible to dispense with additional external lubrication.

The proportion of the glass component, i.e. of the sulfophosphate glass, in the glass/plastic mixture is preferably 15 to 60% by weight. For certain applications, however, the glass content may be up to 80% by weight. The mixtures may also contain standard additives, such as color pigments and stabilizers. Possible applications are, for example, in sensors, actuators, plug connectors, electrooptical components and relays.

The components which are produced using the process according to the invention may particularly be advantageously used in arrangements in which they interact with further components under mechanical friction. In particular, it is possible for the components which are produced using the process according to the invention to be used in electromechanical switches. In such applications, a low-friction performance is particularly important, since it is possible to substantially prevent the electrical contacts from becoming dirty. The reduced friction reduces the energy consumption when the component is operating and extends the service life of the component.

The invention is explained in more detail below with reference to an exemplary embodiment and the associated FIGURE.

BRIEF DESCRIPTION OF THE FIGURE

The FIGURE shows a component which is produced using the process according to the invention together with a second component, in the form of a diagrammatic cross section.

DESCRIPTION OF PREFERRED EMBODIMENT

The FIGURE shows a first component 1 which has been produced using the process according to the invention and is arranged above a second component 2. A force F is acting on the first component 1, pressing it onto the second component 2. Furthermore, the first component 1 is moving transversely with respect to the second component 2, as indicated by the double arrow. Despite the friction which is generated between the first component 1 and the second component 2, the first component 1 is scarcely abraded. The first component 1 can be produced, for example, by injection molding.

Production by injection molding has the advantage that a large number of components can be produced simultaneously in large numbers and in almost any desired form.

The invention is not restricted to the embodiment which is shown by way of example.

What is claimed is:

1. A process for producing a component (1) from a glass/plastic mixture in which, starting from a mixture of a thermoplastic which has a processing temperature T1 and first glass particles with saturated bonds at the surface and with a glass temperature T2<T1, the component is molded at a temperature T3>T1, second glass particles with saturable bonds at the surface being produced as a result of melting of the first glass particles, which saturated bonds are saturated by bonding to the thermoplastic wherein the glass/plastic mixture used contains:

as glass, particles of a low-melting sulfophosphate glass of the following composition, given in mol %: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$, and 19 to 22% of $SO_3$, the constituents together amounting to 100%, and as plastic, a high-performance thermoplastic.

2. The process as claimed in claim 1, in which a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$ is used.

3. The process as claimed in claim 1, in which the high-performance thermoplastic used is a polyether ether ketone, a polyetherimide, a polyphenylene sulfide, a partially aromatic polyamide or a liquid crystal polymer.

4. The process as claimed in claim 1, in which a glass/plastic mixture with a glass content of between 15 and 50% by weight is used.

5. A component made from a glass/plastic mixture, which can be produced starting from a mixture of a thermoplastic which has a processing temperature T1 and first glass particles which have saturated bonds at the surface and a glass temperature T2<T1, the component being molded at a temperature T3>T1, second glass particles with saturable bonds at the surface being produced as a result of the first glass particles melting, which saturated bonds are then saturated, in the final step, by bonding to the thermoplastic wherein the glass/plastic mixture used contains:

as glass, particles of a low-melting sulfophosphate glass of the following composition, given in mol %: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$, and 19 to 22% of $SO_3$, the constituents together amounting to 100%, and as plastic, a high-performance thermoplastic.

6. A lubricant-free component which does not have any exposed glass particles and/or glass-particle ends at the surface comprising the component according to claim 5.

* * * * *